United States Patent

Mackerle

[15] 3,647,012
[45] Mar. 7, 1972

[54] SELF-PROPELLED DRIVE WHEELS

[72] Inventor: Julius Mackerle, Praque, Czechoslovakia

[73] Assignee: Ustav pro vyzkum motorovych vozidel, Praque, Czechoslovakia

[22] Filed: Feb. 18, 1970

[21] Appl. No.: 12,247

[30] Foreign Application Priority Data

Feb. 21, 1969 Czechoslovakia ..................1251-69

[52] U.S. Cl..................................................180/8 F, 305/1
[51] Int. Cl........................................................B62d 57/02
[58] Field of Search...........................180/8.9, 8 F; 305/1

[56] References Cited

UNITED STATES PATENTS 584,218  6/1897  Goddard..............................180/8.9

Primary Examiner—Leo Friaglia
Attorney—Richard Low and Murray Schaffer

[57] ABSTRACT

A self-propelled driver wheel having two series of circumferentially arranged gas chamber globes adapted to be successively inflated. The globes of each series having a diameter at right angles to the diameter of the wheel of between 25–35 percent of the maximum external noncompressed diameter of the driver.

7 Claims, 3 Drawing Figures

PATENTED MAR 7 1972

INVENTOR
JULIUS MACKERLE
BY
ATTORNEY

SELF-PROPELLED DRIVE WHEELS

BACKGROUND OF THE INVENTION

The present invention relates to self-propelled wheels for vehicles, and in particular, to a driver wheel propelled by pneumatic or hydraulic activation of a series of circularly arranged globular resilient and expandable chambers.

In my copending application, Serial No. 8,562 filed Feb. 4, 1970 based upon Czechoslovakian application PV 775–69, filed Feb. 6, 1969, there is disclosed a self-propelled drive wheel provided on its periphery with a series of two spacially noncommunicating resilient spherical gas chamber globes. The two series of gas chamber globes lie along parallel circles which are axially and radially offset or shifted with respect to each other through half a spacing of the chambers so as to interlace with each other laterally and peripherally. Each of the chambers are separately connected through a connecting duct with a distributor or control mechanism, located in the central hub of the wheel, to a source of pressurized gas which is selectively fed to each chamber in such a manner that the resultant of the expansion pressures at the contact surface with the ground, during travel, lies outside a vertical plane passing through the axis of the driver hub.

The value of the driving moment or self-propulsion of wheels of this type depends on suitable timing of the inflation of the individual gas chambers and also on the shape and number of these gas chambers. It has been ascertained that both the shape and number of the globular gas chambers be as large as possible to enable the successively arranged chambers to perform the driving function even after only a small angular turn of the wheel. On the other hand, in order to secure a large driving moment (propulsion force), it is desirable that each gas chamber remain in contact with the ground even after the largest possible angular turn of the wheel from the central position is accomplished and that each chamber have a sufficiently large contact surface with the ground to effect this.

The first criterion is in contradiction with the second one, since if the number of spherical gas chambers is large, their diameter must be restricted with respect to the diameter of the wheel. As a result, the contact surface of each chamber with the ground is small. With spherical gas chambers of a small diameter, the largest possible compression with respect to the diameter of the driver is small, and they quickly lose contact with the ground after only a relatively small angular turn from the central position. On the contrary, although a small number of spherical gas chambers permits their individual diameters to be made larger with respect to the diameter of the driver, successive chambers take over the driving function only after a large angular turn, and as a result, the compression force ability of the driver is reduced and power, for example, to climb a sharp slope is reduced. In addition, it is necessary to take into account that the driver hub must have sufficient space for receiving the control mechanism for the supply of the pressurized gas and the system of ducts from the control mechanism to the individual gas chambers.

It is an object of the present invention to provide a self-propelled driver wheel in which two criteria noted above are complementarily provided for.

It is another object of the present invention to provide a self-propelled driver wheel in which the driver gas chambers are optimumly formed, shaped and arranged.

It is an object of this invention to provide a self-propelled driver wheel embodying improved principles of design, structure and operation.

SUMMARY OF THE INVENTION

According to the present invention, a self-propelled driver wheel is provided having two series of circumferentially arranged gas chamber globes, the globes of each series having a diameter at right angles to the diameter of the wheel of between 25–35 percent of the maximum external noncompressed diameter of the driver.

In preferred form, the wheel is provided with between 6–8 generally spherical globes in each series.

In a modified form, each globe is formed as a spherical section having a tread portion extending radially of the wheel to an extent less than the true sphere so that there is produced a wheel having a substantially continuous circular configuration in side elevation.

Full details and illustrations of the present invention, its objects and advantages will be seen from the following description and the appended drawings.

DESCRIPTION

Figure 1:
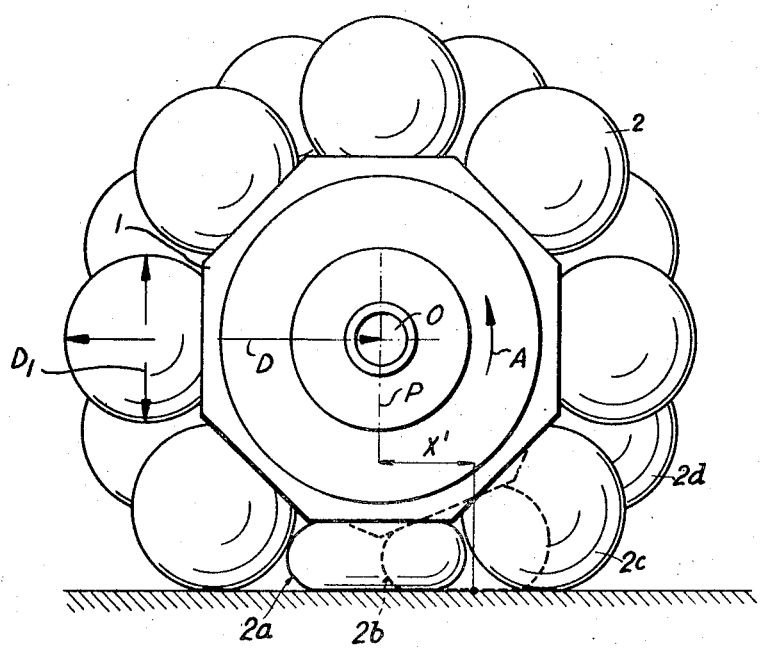
FIG. 1 is a schematic side elevational view of one embodiment of the present invention.

Referring more particularly to FIG. 1, the driver wheel comprises a body 1, forming a central hub mounted for free rotation about the center O of a fixed axle of an otherwise conventional vehicle. Spaced about the body in two equal circles are two series of globular or spherical resilient gas chambers 2. Each series of chamber 2, as shown in this embodiment, comprises eight separate, noncommunicating rubber globes connected by suitable duct means and valve control means (not shown) to a source of pressurized air. The globes of each series are offset from the other, or staggered about a line spaced from the central plane of each circle a distance equal to half the spacing of each chamber so that they interlace or intermesh with each other about the periphery of the wheel.

Each globe 2 is generally symmetrical and has a large diameter $D_1$ extending in a direction perpendicular to or at right angles to the diameter D of the wheel itself. In further accordance with the present invention, the globes of FIG. 1 have a diameter $D_1$ which lies between 25–30 percent of the size of the diameter D of the wheel, taken in an uncompressed condition. Preferably, the diameter $D_1$ of the spherical globe of FIG. 1 is approximately 27 percent of the diameter D.

Figure 3:
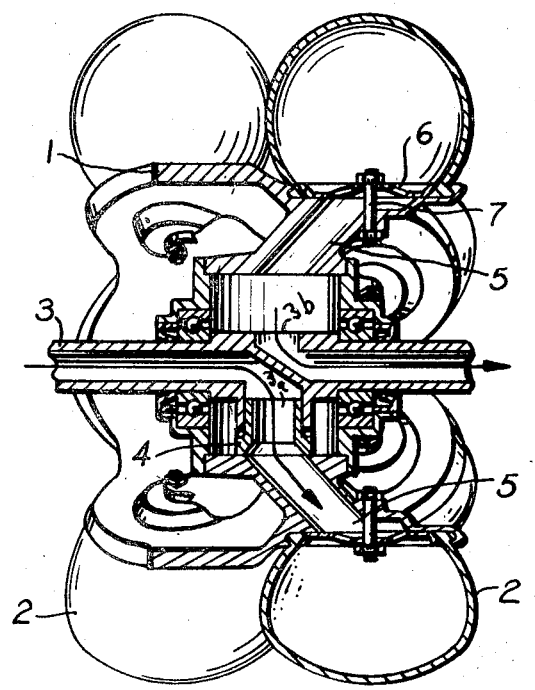
FIG. 3 is a longitudinal section through the wheel showing the fluid driving means.

The gas chambers or globes 2 are otherwise preferably structured, mounted and provided with a source of pressurized fluid and control mechanism, in the manner described in the aforementioned application. In order to maintain the present disclosure brief and concise, the description set forth in the aforementioned application is incorporated herein by reference as if more fully set forth. The control means and related fluid conduits for supplying the globes 2 is shown in FIG. 3. As seen in this figure the globes 2 revolve about a central hollow axle shaft 3 which is sealed midway along its length to form an inlet part entering from the left and an outlet part exiting from the right. Compressed air or other gaseous media is supplied to the inlet part of the axle 3 from a source thereof not shown but normally located on the vehicle. Following the direction of the arrow seen in FIG. 3, the gas passes through a hole 3a in the axle 3 through a slide valve 4 to a duct 5 leading to a globe 2. Each globe 2 is provided with its own duct 5 so as to be separately and sequentially fed with the gaseous media as the wheel moves. The slide valve 4 is connected externally by rod linkages (not shown here) to the operator's position or driver's seat and is rotatable about the axle 3 to provide a variable opening into duct 5. After the wheel turns, gas is discharged from the globes 2 through the corresponding duct 5 and through a hole 3b in the axle into the exit portion of the hollow axle 3. Each globe 2 is hermetically sealed to the wheels by means of fastening plates 6 and screws 7. Thus, gas, preferably air, is fed to each chamber 2, in selective, sequential manner to successively inflate and expand each globe to cause rotation of the wheel.

Returning now to FIG. 1, the globes 2 are most compressed when in position 2a. However, in this position, it does not develop any driving moment due to the fact that it is centrally located in a position where the center of its contact surface or foot with the ground lies in a vertical plane P passing through the wheel axis O. When located at position 2b, each globe 2 is, however, turned out from the central position through an angle of 22.5°. While it is considerably compressed, as indicated by the dashed contour, it is now situated with the center of its contact surface at a distance X' from the perpendicular plane P. Therefore, it develops a considerable driving moment, causing the wheel to turn in the direction of the arrow A. When the globe 2 is in the position 2c and is further-turned out from the central position P through an angle of 45°, it is still in contact with the ground, but its contact surface is small and it no longer has a large carrying or turning movement capacity. Finally, the chamber 2, when in position 2d (i.e., turned out from the central position through 67°), is no longer in contact with the ground and it does therefore not develop any driving moment.

It will be seen from the foregoing that because of the defined ratio between the diameter $D_1$ of the globular chambers 2 and the wheel diameter D, there is advantageously produced a tread or foot of considerable area, which remains in contact with the ground surface through a large turning angle. Support for the vehicle is thereby maintained not just by one gas chamber but by two or even more. Furthermore, major support of the wheel is borne by the globes located in the central position 2a and also in part by the globes in position in 2b. This allows the following globes, i.e., those in major portion of their expanding energy to drive the wheel. The centrally located globe in position 2a does not develop any driving moment and therefore it is preferable that it be fed with only low pressure as are the other globes in the position prior to it with respect to the vertical plane p. High-pressure gas however should be fed to the globes in position 2b and 2c. The result is a smooth and efficient rotation and ride of the wheel.

Figure 2:
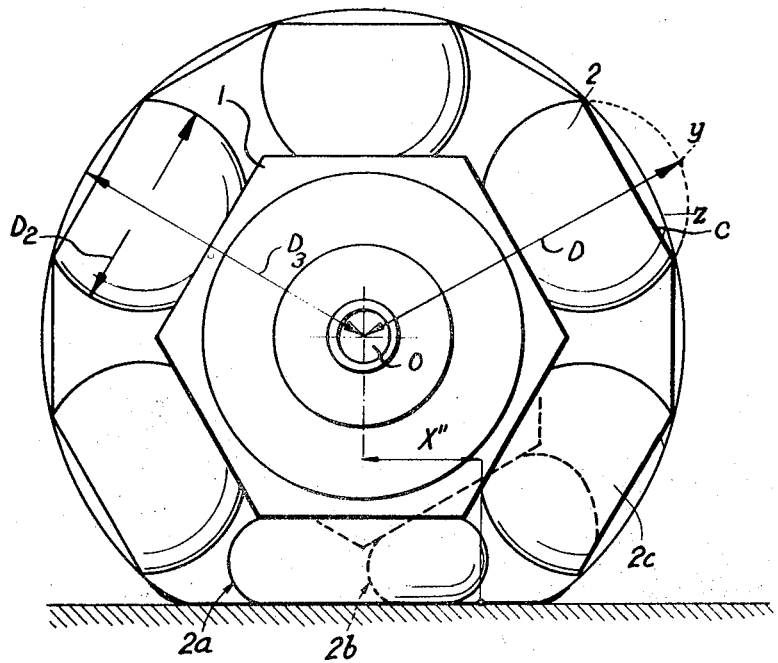
FIG. 2 is a similar view showing a second embodiment.

In the embodiment illustrated in FIG. 2, the circumference of body 1 of the driver wheel carries two series of gas chambers; however, each has six spherical globes 2. In this embodiment, the globes 2 are not spherical and are formed with a flattened tread bottom Z in a manner to be explained later. The ratio of diameter of the largest globe diameter $D_2$ at right angles to the wheel diameter D at the largest maximum noncompressed condition is here approximately 31 percent.

Conditions here are similar to those shown in the preceding first example. Gas chamber 2, when in position 2a, is situated in the central vertical plane P. It is compressed to the highest degree and does not develop any driving moment. When in position 2b, the chamber 2 is turned out from the central position through 30°, and has a large residual contact surface with the ground. Since the center of this residual contact surface is situated at a large distance X'' from the vertical plane P passing through the wheel axis, it develops a large driving moment. In position 2c which is turned out from the central position through 60°, the chamber 2 no longer is in contact with the ground and it does therefore not develop any driving moment.

It is obvious that the larger diameter of the gas chambers in the embodiment of FIG. 2 permits their greater compression and a larger contact surface with the ground. It also permits a larger distance between the center of this contact surface and the vertical plane passing through the wheel axis, resulting therefore in a larger driving moment.

A decrease in the number of gas chambers 2, however, increases the spacing between each. Therefore, too few globular chambers 2 reduces the number and/or the amount of the tread or foot in contact with the surface of the ground. Thus, if the spacing is made too large (that is, the number of globes too few), a situation may occur that when one chamber is at the position 2b where it develops the driving moment, the next chamber is not yet off the central vertical plane P at position 2a, and is thus not able to pick up the driving function of the wheel. From the mathematical point of view it is clear that for the most convenient cooperative effect of all resilient gas chambers, which are in action, i.e., in contact with ground and pressurized, the number should be between six and eight as seen in FIGS. 1 and 2 respectively. This has also been ascertained by practical tests, too. This number permits the chambers to be chosen with a large diameter so that they can easily be deformed. This fact also provides the advantages of establishing a long lever arm (arm X) for the resultant force from the vertical plane V passing through the point of contact of wheel with ground.

On the other hand, should the decrease in the number of globes be made up by an increase in their individual diameter, then the space between each may be unduly restricted and may require the decrease of the size of the central hub to a point where the structure and operation of the pressurized gas control system is weakened.

As noted before, the embodiment illustrated in FIG. 2 is also characterized by the fact that the bottom tread or foot portion Z of each globe 2 is somewhat flattened. Each globe 2 is formed as a modified spherical section, the tread lying along an arc Z formed by a chord C. The arc Z is spaced a distance $D_3$ from the center O of the wheel which is substantially less than what would be the normal uncompressed diameter D of the wheel if the globes were substantially spherical, i.e., if the lateral sidewall portions of the globe were extended to the dotted line Y. Thus, the tread portions Z of the uncompressed globes 2 all lie along a continuous circle about the center 0. In this case, the maximum external diameter $D_3$ of the driver wheel is smaller than if the globes were spherical, but the contact surface of each globe increases faster as it touches the ground substantially elongating the tread or foot and enabling the moment of turning to be increased because the vertical centers are further offset than otherwise would be the case.

The globes of FIG. 2, and for that matter of FIG. 1, may be made in accordance with any of the well-known techniques for building automotive tires, with the usual heads, sidewall reinforcement and tread configuration for desired function and antiskidding characteristics.

What is claimed:

1. In a vehicle a self-propelled wheel comprising a plurality of independent noncommunicating resilient chambers adapted to be in compressive contact with the ground, said chambers being circumferentially arranged about a central hub, each chamber being separately joined to a source of gas under pressure and having control means for supplying said gas thereto in such a manner that the resultant pressure in the contact surface of the chamber with the ground lies outside of the plane perpendicular to the axis of said hub, each of said chambers having its largest diameter perpendicular to and approximately 25–35 percent of the uncompressed diameter of the wheel.

2. In a vehicle a self-propelled wheel comprising a plurality of independent noncommunicating resilient chambers adapted to be in compressive contact with the ground, said chambers being circumferentially arranged about a central hub, each chamber being separately joined to a source of gas under pressure and having control means for supplying said gas thereto in such a manner that the resultant pressure in the contact surface of the chamber with the ground lies outside of the plane perpendicular to the axis of said hub, said chambers being arranged in two parallel circular series, the chambers of one series being staggered with respect to the other series along a common line so as to be phase interlaced and alternatively brought into contact with the ground.

3. The wheel according to claim 2 wherein each of said chambers comprises a resilient spherical globe, the largest diameter of which is approximately 25–35 percent of the uncompressed diameter of the wheel.

4. The wheel according to claim 2, wherein each of said chambers comprises a spherical sectioned globe having a surface contact portion forming an arc spaced a distance from the center of the wheel substantially less than the diameter of said wheel if the globes were spherical.

5. The wheel according to claim 4, wherein the largest diameter of said globes is 34 percent of the uncompressed diameter of said wheel.

6. The wheel according to claim 2, wherein each circular series comprises eight resilient globes.

7. The wheel according to claim 2, wherein each series comprises six resilient globes.

* * * * *